Figure 1:
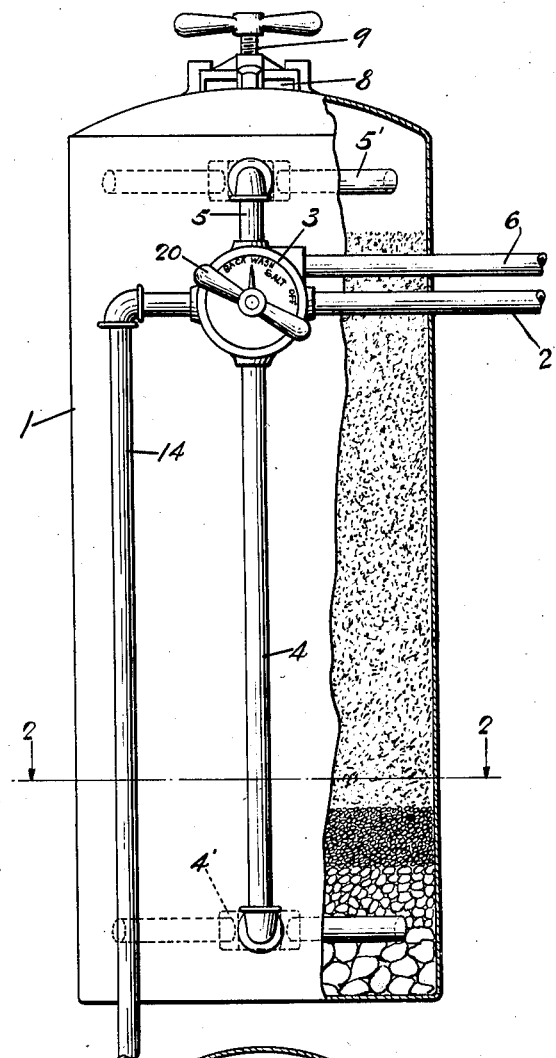

Aug. 23, 1932. E. J. DE VILLE 1,873,306
WATER SOFTENING APPARATUS AND MULTIWAY VALVE FOR SAME
Filed Aug. 14, 1925 2 Sheets-Sheet 1

Aug. 23, 1932.  E. J. DE VILLE  1,873,306
WATER SOFTENING APPARATUS AND MULTIWAY VALVE FOR SAME
Filed Aug. 14, 1925  2 Sheets-Sheet 2

Inventor
Edward J. De Ville
By J. Walker
Attorney

Patented Aug. 23, 1932

1,873,306

UNITED STATES PATENT OFFICE

EDWARD J. DE VILLE, OF DAYTON, OHIO, ASSIGNOR TO THE PERMUTIT COMPANY, OF NEW YORK, N. Y., A CORPORATION OF DELAWARE

WATER SOFTENING APPARATUS AND MULTIWAY VALVE FOR SAME

Application filed August 14, 1925. Serial No. 50,205.

My invention relates to water softening apparatus and particularly to a system of valved conduits for controlling the directional flow of water during different stages of softening, rejuvenation and back wash of the softening material. The invention pertains to that type of water softeners wherein the water is treated by being percolated through a bed of base exchange agent either natural or artificial, having the characteristics of attracting and separating from the water the calcium and magnesium, which give to the raw or untreated water its "hard" characteristics.

After more or less extended periods of use, such base exchange material becomes more or less clogged with calcium and magnesium deposits and loses its softening effect. The softening agent is then rejuvenated by a treatment of salt brine (sodium chloride), which is washed through the filter bed and the base exchange agent is then thoroughly rewashed to remove the spent salt brine, after which the softening power of the material is restored for a further period of usefulness.

Such water softening apparatus is frequently installed in residences, hotels, laundries, hospitals, hair dressing parlors and like institutions, where they are under the care and attention of persons unskilled and usually more or less uninformed as to the theory and principle of operation. For this reason, it is necessary for successful operation that the control devices be reduced to simplest form. While the change of directional flow of water may be achieved by the use of separate valves, located in the different conduits, the present construction is designed to enable the control of the various stages of operation by the adjustment of a single control handle to different indicated positions.

Whereas such water softening apparatus as usually installed includes a separate compartment or salt pot to receive the rejuvenating charge of salt or sodium chloride, in the present instance such salt pot is omitted, and it is contemplated that the salt charge will be introduced directly into the softening tank. When the water passing through the softening tank is normally under pressure, it is necessary that this pressure be relieved, and that the upper portion of the tank be drained of sufficient water to permit the opening of the top of the tank and the introduction of the charge of salt, without causing the water to overflow the tank. To this end, the present construction is so arranged that when the control valve is turned to its "off" position, wherein the raw water supply to the softener tank is arrested, the upper portion of the tank is vented through a waste outlet, permitting a portion of the water to drain from the tank, thus reducing the internal pressure and lowering the water level to permit the introduction of the rejuvenating salt charge. This salt charge is introduced through a normally sealed hand hole in the top of the tank, and is allowed to dissolve and percolate downward through the bed of softening material within the tank. Inasmuch as the rejuvenation of the softening bed requires a considerable period of time, the discontinuance of the water supply during this period might prove not only inconvenient but when utilized for hot water boilers, or as a condenser medium for residence refrigerator systems and the like, such discontinuance of the water supply may prove disastrous. To provide for such contingency, the control valve of the present apparatus is so arranged that when turned to the off position, in which the raw water supply to the tank is discontinued, the water supply conduit is connected directly with the water distribution conduit, so that during such period, the hard or untreated water is supplied throughout the distribution system, without interruption of service.

The object of the invention is to simplify the structure, as well as the means and mode of operation of control systems for water softening apparatus, whereby such apparatus will not only be cheapened in construction, but will be more efficient in operation, easily controlled, capable of being adjusted and cared for by unskilled persons and unlikely to get out of repair.

A further object of the invention is to provide a construction wherein the water control conduits are all interconnected and valve controlled, and wherein the disconnection of the supply conduit from the softening tank will automatically connect such supply conduit directly with the distribution system, to insure a water supply during the rejuvenation period.

A further object of the invention is to provide a water softening apparatus, wherein the rejuvenation charge of salt is introduced directly into the softening tank or chamber and in which the valve operation necessary to discontinue the water supply to the tank or chamber will automatically open such tank or chamber to a waste conduit to relieve the internal pressure and drain sufficient water from the top of the tank to permit the introduction of the salt charge.

With the above primary and other incidental objects in view as will more fully appear in the specification, the invention consists of the features of construction, the parts and combinations thereof, and the mode of operation or their equivalents as hereinafter described and set forth in the claims.

Figure 2:
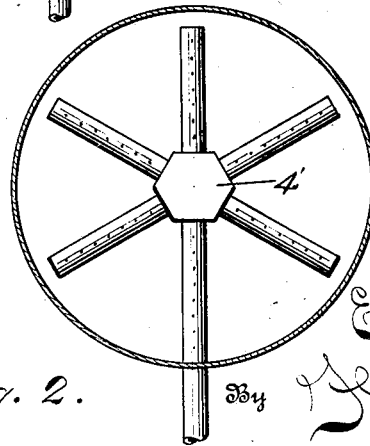
Figure 3:
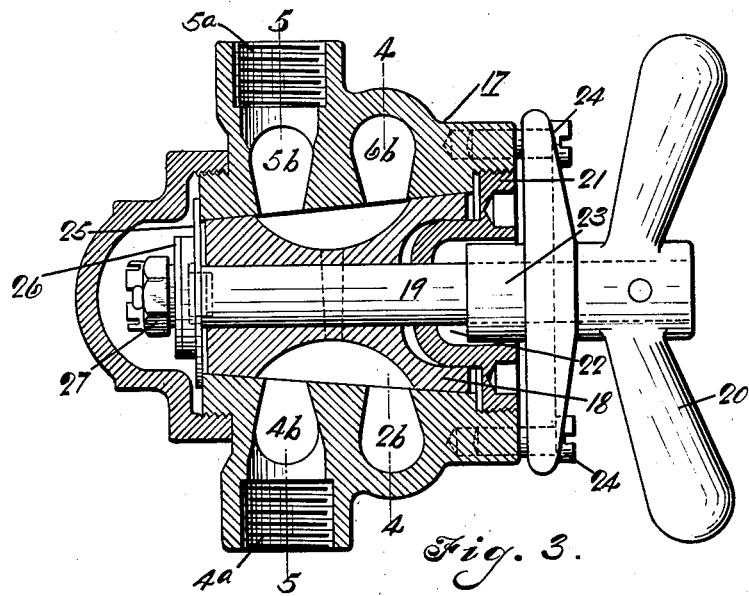
Figures 4, 5:
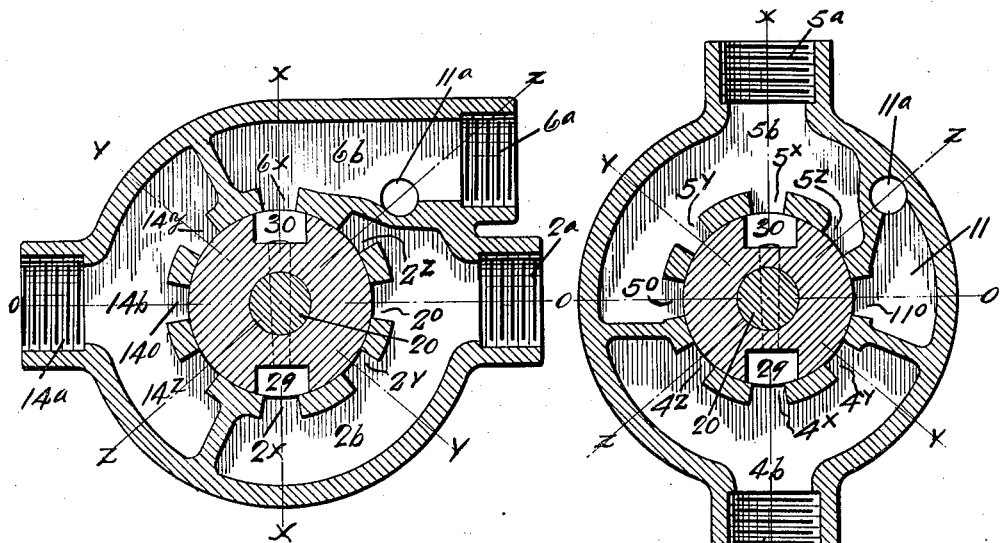

Referring to the accompanying drawings, wherein is shown the preferred, but obviously not necessarily the only form of embodiment of the invention, Fig. 1 is a front elevation of a water softening apparatus embodying the present invention. Fig. 2 is a transverse sectional view thereof. Fig. 3 is a longitudinal sectional view of the control valve. Figs. 4 and 5 are transverse sectional views on lines 4—4 and 5—5 of Fig. 3.

Like parts are indicated by similar characters of reference throughout the several views.

In the drawings, 1 indicates a tank or chamber in which is contained the bed of water softening material. This bed ordinarily consists of a substratum of coarse gravel at the bottom of the tank, on which is superposed a stratum of medium sized gravel and thereupon a stratum of finer gravel or the like. Upon this sub-bed is placed the bed of base exchange or analogous material, which effects the separation of the calcium and magnesium from the water during its passage therethrough. Such bed may comprise natural material which possesses water softening characteristics, known upon the market under various commercial names, such as "zeolites", "Naolite Mineral" and similar terms, or such softening agents may be artificially prepared, the particular character of the material forming no part of the present invention. On the front of the tank 1 is disposed the valved conduit system, by which the directional flow of the water is controlled in various stages of operation.

Briefly stated, the circuitory system for the water comprises an inlet or supply conduit 2 for raw or hard water, which discharges through suitably registering ports in a control valve 3, to the downwardly extending conduit 4, which communicates with the interior of the tank 1, adjacent to the bottom thereof. Within the tank 1, the conduit 4 is provided with a distributing head 4′ comprising a series of radially disposed perforated pipes, which insure a uniform distribution of water throughout the softening bed, preventing the formation of bores or channels therein. The water percolates upward through the superposed strata of the bed within the tank 1, where it is subjected to the softening effect of the base exchange material. The treated or softened water is collected from the top of the tank, through a series of radially disposed perforated pipes 5′ similar to the distributor head 4′, which collection head communicates through the conduit 5 leading from the top of the head with the control valve 3, through which the treated water passes to the supply or service conduit 6, connected with the distribution system to which the water is supplied for domestic or other use. This is the normal direction of flow during the water softening stage of operation. When the softening capability of the bed within the tank 1 has been exhausted, it becomes necessary to rejuvenate the softening agent by the circulation of salt brine therethrough. In lieu of employing a separate chamber or salt pot to receive such rejuvenation charge, the salt in the present instance is introduced directly into the tank 1. To this end the tank is provided with a removable lid 8 clamped thereon by the clamp screws 9, so that the lid may be tightly secured upon the tank. Upon a partial rotation of the handle of the main control valve to its "off" position, preparatory to charging the tank with salt, the supply conduit 2 is disconnected from the tank 1, and is connected directly to the service or distribution conduit 6, as will be hereafter described, while at the same time, the outlet conduit 5 leading from the top of the tank is connected through the control valve with a drain or waste conduit 14. By thus arresting the supply of raw or untreated water to the tank, and opening the top of the tank to the waste drain, the pressure within the tank is relieved and the accumulation of water is drained off from the top of the tank to the level of the collector head 5′. This permits the lid 8 to be removed and an ample charge of salt to be introduced directly into the top of the tank. However, sufficient water will remain in the tank to dissolve the charge of salt and the brine formed thereby will percolate downward through the base exchange bed. Best results are obtained by allowing the salt brine to stand in the bed for a considerable length of time depending somewhat upon the previous period of use and the character of the water treated, hence the amount of calcium and magnesium deposited. During the meantime, however, raw or untreated water is being supplied through the service or distribution conduit 6 for emergency use. After the salt brine has been allowed to stand within and react with the bed sufficiently to release the calcium and magnesium deposit and to rejuvenate the softening material, the handle of the control valve is partially rotated to the salt position. In this position the water supply is again admitted to the tank, but is directed by the control valve upwardly, through the pipe or conduit 5 leading into the top of the tank, effecting a downward flow of the salt brine, through the softening bed. This salt brine is withdrawn from the tank 1 at the bottom through the head 4′ and conduit 4, through which it is conducted upwardly to the control valve, which, in the salt position, connects the conduit 4 with the waste or drain conduit 14, thus carrying the salt brine to the sewer or other disposal. After the brine has been completely withdrawn from the tank, to insure complete elimination of the salt and cleansing of the softening bed, water is circulated in the reverse direction from the supply conduit 2, to the outlet 14. This is effected by adjusting the control valve to "back wash" position. In this "back wash" position of the control valve, the water supply passes from the inlet conduit 2 downwardly through the conduit 4 to the bottom of the tank and thence upwardly through the softening bed, being drawn off through the collecting head 5′ and conduit 5, which is in communication through the control valve 3, with the waste or drain conduit 14. This back wash operation is continued until all trace of the brine is removed. Upon the return of the control valve 3 to its normal or service position, the water will continue to circulate from the supply conduit downwardly through the conduit 4, and thence upwardly through the filter bed, leaving the tank through the conduit 5, but in such service position the conduit 5 is connected through the valve 3, with the outlet or distribution conduit 6.

While various forms of control valve and operating connections may be employed to effect the divergence of the water flow during the several stages of operation before described, the main control valve 3 is preferably of the rotary type, as illustrated in Figs. 3, 4 and 5. This valve structure consists of a housing or shell 17, having therein a tapered bore to receive the rotary tapered plug or barrel 18. This plug or barrel 18 is secured upon a shaft 19, carrying at its outer end a handle 20 by which the valve plug or barrel may be rotated. Secured in the shell or housing is a head 21, forming a packing gland or chamber 22, to receive a body of packing compressed by the gland member 23, which is adjusted by means of screws 24. At the opposite end of the valve the shaft or stem 19, carries a disc washer or collar 25, bearing upon the housing 17, and on which, in turn, there is a resilient collar or washer 26, of rubber placed under compression by a nut 27. Obviously, a helical spring may be substituted for the compressible collar 26. The valve housing is provided with a number of ports and communicating chambers, which for convenience of identification are designated by reference characters corresponding to the respective conduits leading thereto, to which are added letter exponents. The chambers and ports are arranged in two parallel series located in parallel planes. In the forward plane 4—4, there are located three orifices $2^a$, $6^a$ and $14^a$, connecting the inlet conduit 2, service conduit 6 and waste conduit 14 with the valve chambers $2^b$, $6^b$ and $14^b$, respectively. In the second or rearward plane 5—5, there are also located two orifices $4^a$ and $5^a$, connecting the tank bottom conduit 4 and tank top conduit 5 with chambers $4^b$, and $5^b$ respectively. There is also in this plane a third chamber 11, which is in constant communication through an orifice $11^a$, directly with the outlet or distribution chamber $6^b$.

The rotary valve plug or barrel 18 has therein two by-pass ports 29 and 30, located at diametrically opposite points. Each port 29 and 30 serves to connect a valve chamber of the series 5—5 with a valve chamber of the series 4—4. The rotary valve barrel 18 has four operative positions of adjustment. For identification, these are indicated as on the diametrical line $x$—$x$, which is the service position, $y$—$y$, which is the rewash position, $z$—$z$, indicating the salt or brine position, and $o$—$o$ indicative of the "off" or preparatory position. Because of the interconnection of the valve chambers of one series, alternatively with different chambers of the second series in different operative positions of the valve, it will be noted that certain chambers have multiple ports, with any one of which the by-pass ports of the rotary plug or barrel 18 may be registered. In the normal or service position, the by-pass ports 29 and 30 are disposed upon the vertical diameter $x$—$x$, which is the service position, as indicated in Figs. 4 and 5. In this service position, illustrated in the drawings, the by-pass port 29 of the barrel 18, communicating through the auxiliary port $2^x$ with the inlet or supply chamber $2^b$ interconnects the supply conduit 2 leading to such chamber with the chamber $4^b$, shown in Fig. 5, with which the by-pass port 29 communicates through the auxiliary port $4^x$. Water entering the chamber $2^b$, through the inlet port $2^a$ passes through the by-pass port 29 to the chamber $4^b$ and thence through the conduit 4 to the bottom of the tank. After flowing upwardly through the body of softening material, the water leaves the tank through the collecting head $5'$ and conduit 5, which is connected to the port $5^a$ with the chamber $5^b$ of the valve. (Fig. 5.) This chamber $5^b$ is in communication with the outlet chamber $6^b$, through the auxiliary port $5^x$, by-pass port 30 and auxiliary port $6^x$. Thus the softened or treated water passes to the service or distribution conduit 6.

Upon necessity for rejuvenation, the rotary lug or valve barrel 18 is turned through a partial rotation until the by-pass ports 29 and 30 are disposed upon the horizontal diameter $o$—$o$. The port 30 of the valve barrel 18 then registers with the auxiliary port $2^o$ of the inlet chamber $2^b$ and at the same time registers with the port $11^o$ of the chamber 11. The supply of water entering through the conduit 2 to the chamber $2^b$, passes thence through the port $2^o$, by-pass 30 and port $11^o$ into the chamber 11, which as before mentioned is in direct communication through the orifice $11^a$ with the outlet or distribution chamber $6^b$. The water thus passes directly from the supply conduit through the outlet chamber $6^b$, and distribution conduit 6, without entering the tank 1. At the same time the by-pass port 29 of the barrel or plug 18 is in registry with the port $5^o$ and port $14^o$, thereby connecting the chamber $5^b$, through such by-pass 29, with the waste chamber 14. This enables the water to drain from the top of the tank 1 to the level of the outlet conduit 5, through such conduit 5 then through the chamber $5^b$, by-pass port 29 and waste chamber $14^b$, into the outlet drain conduit 14. The pressure within the tank being thus relieved and the water level lowered sufficiently to permit the introduction of the salt charge, the lid 8 is removed and the salt is introduced directly into the tank, in which sufficient water will still remain to dissolve the charge of salt. The salt brine is allowed to settle and stand within the tank for a greater or less period of time according to conditions of the softening bed, and the previous period of active operation. When it is desired to withdraw the salt brine the valve plug or barrel 18 is turned to the position $z$—$z$, in which the by-pass port 30 will register with the port $2^z$, communicating with the inlet chamber $2^b$, and simultaneously register with the port $5^z$, thereby connecting the supply chamber $2^b$ thru the by-pass 30 with the chamber $5^b$, from which the conduit 5 leads to the top of the tank. The water entering under pressure at the top of the tank passes downward through the softening bed, diluting and carrying with it the salt brine, which is drawn off at the bottom of the tank through the collecting head $4'$ and conduit 4, which leads to the chamber $4^b$. In this salt or $z$—$z$ position of the valve, the chamber $4^b$ of the valve communicates through the by-pass 29 and auxiliary ports $4^z$ and $14^z$, with the waste or outlet chamber $14^b$, from which leads the drain conduit 14. The salt brine being entirely drained from the tank, and it being desired to rewash the softening material, the valve barrel is adjusted to the rewash or $y$—$y$ position, wherein the by-pass 29 will simultaneously register with the auxiliary port $2^y$ of the inlet or supply chamber and the auxiliary port $4^y$ of the chamber $4^b$. This conducts the supply of water from the inlet conduit 2 through the chamber $2^b$, into the chamber $4^b$, from which it passes downwardly through the conduit 4 to the bottom of the tank and circulating upward through the softening bed, emerges from the tank through the conduit 5. This wash water conducted thru the conduit 5 enters the valve chamber $5^b$. In this rewash position of the valve, the by-pass port 30 is in registry with the port $5^y$, and simultaneously with the port $14^y$ of the waste chamber $14^b$. Therefore, the water drawn from the top of the tank thru the conduit 5, entering the chamber $5^b$ passes thence through the by pass port 30 into the waste chamber $14^b$, and escapes through the waste drain conduit 14. When all trace of the salt brine has been removed, the valve is returned to its normal or service position, indicated at $x$—$x$ in which the water is circulated from the supply conduit 2, downwardly through the conduit 4 to the bottom of the tank, then upwardly through the base exchange bed and is withdrawn through the conduit 5, which in this adjustment is connected through the chamber $5^b$ and by-pass 30 with the outlet or distribution chamber $6^b$. This is the normal operative position of the valve as initially described. By the construction illustrated and described, the adjustment of the valve necessary to shut off the supply of water preparatory to rejuvenation or charging with salt, also automatically opens the tank through the waste conduit to relieve the pressure and drain off sufficient water to permit the tank to be opened for the introduction of the salt charge. At the same time, the water supply is not discontinued, but raw or untreated water is temporarily supplied to the distribution system, by the mere act of shutting off the water supply from the tank and opening the tank, preparatory to recharging.

The distribution system described affords a simple and effective method of controlling the directional flow of water, by means of a single operating handle, the adjustment of which is within the ability of any unskilled person, even though without knowledge of the theory and principle of operation. Likewise the distribution system, including the conduit connections and valve as described, comprises a compact unitary structure, which may be completely assembled upon the tanks at the place of manufacture, thus insuring the proper connection being made and materially reducing the cost of installation.

Cross reference is made to my companion application Serial No. 44,297, filed July 17, 1925.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. A valve for use in connection with a water softening tank or the like having top and bottom conduit connections, comprising a valve housing having therein two series of chambers arranged in parallel planes and including a chamber communicating with the top of the tank, another chamber communicating with the bottom of the tank, a supply chamber, an outlet chamber, a waste chamber and a bypass chamber serving to connect the supply and outlet chambers independently of the tank, and an adjustable control member for connecting the supply chamber to the tank bottom and simultaneously connecting the tank top to the outlet chamber, and capable upon further adjustment of maintaining the supply chamber in communication with the bottom of the tank while simultaneously connecting the top of the tank with the waste chamber, said control member serving upon additional adjustment to connect the supply chamber with the top of the tank and simultaneously connect the bottom of the tank with the waste chamber and upon adjustment to a different position acting to connect the supply chamber directly to the outlet chamber independently of the tank and to simultaneously connect the waste chamber with the top of the tank.

2. In a construction of the character described, an annular valve housing having a central bore, a revoluble valve plug therein, a plurality of chambers in said valve housing arranged in two parallel series concentric with said central bore and communicating therewith, conduit connection ports leading to the respective chambers, the individual chambers being arranged circumferentially in their respective series with one chamber of one series overlapping two chambers of the other series, said revoluble valve plug having therein a bypass connecting a chamber of one series with an overlapping chamber of the other series, said chambers being connected in different pairs by the partial rotation of said valve plug.

3. In a construction of the character described, a valve housing having a central bore, a revoluble valve plug therein, said housing having therein two parallel series of chambers circumferentially arranged relative to said central bore and communicating therewith in registering radial positions, said chambers being of different circumferential extent and disposed in different radial positions whereby a chamber of one series is disposed in overlapping relation with a plurality of chambers of the other series, conduit connections to said chambers and by-passes in said valve plug for simultaneously but independently connecting two chambers of one series with two chambers of the other series, the chambers being connected in different pairs by the partial rotation of the valve plug.

4. In a construction of the character described, a valve housing having a central bore, a revoluble valve plug therein, two parallel series of valve chambers in said housing arranged concentrically of said valve plug and circumferentially offset, whereby a chamber of one series overlaps a plurality of chambers of the other series, conduit connections leading to the chambers, said valve plug having therein a by-pass connecting a chamber of one series with a chamber of the other series, said chambers being connected in different pairs by the partial rotation of the valve plug, there being a chamber of one series permanently connected with a chamber of the other series independently of the adjustment of the valve plug.

5. In an apparatus of the character described, a valve housing having a central bore, a revoluble valve plug therein, two parallel series of overlapping valve chambers arranged circumferentially of said central bore and communicating therewith, the chambers of each series being non-intercommunicating, said valve plug being adjustable to predetermined radial positions, and having a bypass therein connecting a given chamber of one series with any one of a plurality of chambers of the other series by its adjustment to different radial positions.

6. In an apparatus of the character described, a valve housing having a central bore, a revoluble valve plug therein, two parallel series of non-intercommunicating valve chambers arranged circumferentially of said central bore, the chambers of the respective series being circumferentially disposed in overlapping relation with the chambers of the other series, ports in the overlapping chambers aligned in the same radial position affording communication with the central bore, and a bypass recess in said valve plug brought into registry with said aligned ports by the partial rotation of said plug.

7. A valve for a water softening apparatus, wherein a softening tank is provided with inlet and outlet connections, a supply conduit, a service conduit and a waste conduit, comprising a control valve common to the several conduits, including a valve housing having therein two series of chambers arranged in parallel planes, the chambers of each series having ports aligned in the same radial positions with the ports of the chambers of the other series, and a revoluble valve member having therein longitudinally disposed surface by-pass grooves connecting such like radially positioned chamber ports one with another upon rotation of such valve member to register such by-pass grooves successively with the aligned ports.

8. A valve for a water softening apparatus wherein the filter is periodically rejuvenated by the circulation of a chemical agent therethrough, comprising a valve housing having therein two annular concentric series of chambers arranged in parallel planes and having therein a centrally disposed bore with which all the chambers communicate, the chambers of one series having ports leading to such bore located in different radial positions and aligning with the positions of ports leading from the second series of chambers to such bore, and a revoluble shutoff body in said bore having therein a plurality of longitudinal surface indentations forming bypasses simultaneously connecting different chambers into non-communicating pairs by the rotation of said body, there being one chamber communicating with the top of the tank and another with the bottom of the tank, a supply chamber, an outlet chamber, a waste chamber, and a bypass chamber to afford connection from the supply chamber to the outlet chamber.

9. A valve for use in connection with a water softening tank or the like having top and bottom conduit connections, comprising a valve housing having therein two series of chambers arranged in parallel planes and including a chamber communicating with the top of the tank, another chamber communicating with the bottom of the tank, a supply chamber, an outlet chamber, a waste chamber and a bypass chamber serving to connect the supply and outlet chambers independently of the tank, the chambers of one series having ports radially positioned in alignment with ports of chambers of the other series, and an adjustable valve member for simultaneously connecting similarly positioned ports of the chambers of each series into separate pairs.

10. In a water softening apparatus comprising a softening tank with two connections thereto, a supply conduit, a service conduit and a waste conduit, a multiway control valve common to said connections and conduits, said valve comprising a housing containing separate chambers communicating respectively with said connections and conduits and an auxiliary chamber communicating with the service chamber and means in said valve adapted to be adjusted to connect the supply and service chambers through the two tank connection chambers or to connect the supply and service chambers through the auxiliary chamber and to simultaneously connect one of the tank connection chambers with the waste chamber or to connect the supply chamber with either of the two tank connection chambers and the other tank connection chamber with the waste chamber.

11. A valve for a water softening apparatus, wherein a softening tank is provided with inlet and outlet connections, a supply conduit, a service conduit and a waste conduit, comprising a control valve common to the several conduits and adapted to connect the supply conduit at will through the tank from bottom to top thereof either to the service conduit or to the waste conduit, said valve being adapted upon further adjustment to simultaneously shut off the supply conduit from said tank and open the tank to the waste conduit and upon still further adjustment to connect the supply conduit through the tank from top to bottom to the waste conduit.

12. A valve for a water softening apparatus, wherein a softening tank is operative through alternating periods of active softening and regeneration and has a supply conduit leading thereto, a service conduit and a waste conduit leading therefrom and said tank has an elevated outlet below the top of the tank, said valve comprising means for connecting the waste conduit with the elevated outlet of the tank when the supply conduit is shut off to partially drain the tank preparatory to the introduction thereinto of a charge of regenerating material.

13. Means for controlling the flow of water through a water softening tank having supply, outlet and waste conduits associated therewith, comprising a control valve common to said conduits for varying their connection with the tank and with each other, said valve comprising a valve housing having therein two groups of chambers arranged in parallel planes wherein chambers of one group register with chambers of the other group occupying similar radial positions, one of said groups comprising supply, outlet and waste chambers with which the said conduits respectively communicate, the other group of chambers including one communicating with the top of the tank, one communicating with the bottom of the tank and an auxiliary chamber in permanent communication with the outlet chamber, and an adjustable member having by-pass ports for connecting said chambers of the respective groups occupying like radial positions in pairs by the adjustment of which the supply conduit may be connected through the tank to the outlet conduit, or may be connected reversely through the tank in either direction with the waste conduit, or connected through said auxiliary chamber directly with the outlet conduit independent of the tank.

In testimony whereof, I have hereunto set my hand this 28th day of July A. D. 1925.

EDWARD J. DE VILLE.